United States Patent [19]

Fujita et al.

[11] Patent Number: 4,478,917
[45] Date of Patent: Oct. 23, 1984

[54] FUEL CELL

[75] Inventors: Kazunori Fujita, Ibaraki; Kohki Tamura, Hitachi; Hidejiro Kawana, Hitachi; Kazuo Iwamoto, Hitachi; Tatsuo Horiba, Hitachi, all of Japan

[73] Assignee: Hitachi, Ltd., Tokyo, Japan

[21] Appl. No.: 479,097

[22] Filed: Mar. 25, 1983

[30] Foreign Application Priority Data

Mar. 26, 1982 [JP] Japan ................................ 57-49804

[51] Int. Cl.³ ..................... H01M 8/10; H01M 4/86
[52] U.S. Cl. ......................................... 429/33; 429/42
[58] Field of Search ................................ 429/33, 42

[56]     References Cited
       U.S. PATENT DOCUMENTS

| 3,134,697 | 5/1964 | Neldrach | 136/86 |
| 3,423,228 | 1/1969 | Oster | 204/29 X |
| 3,668,014 | 6/1972 | Katsoulis et al. | 429/42 |
| 3,706,602 | 12/1972 | Miller | 429/42 |
| 4,215,183 | 7/1980 | MacLeod | 429/42 X |
| 4,262,063 | 4/1981 | Kudo et al. | 429/42 X |
| 4,364,803 | 12/1982 | Nidola et al. | 204/30 |
| 4,390,603 | 6/1983 | Kawana et al. | 429/41 X |

FOREIGN PATENT DOCUMENTS 138874  10/1981  Japan .................................. 429/42

Primary Examiner—Brian E. Hearn
Assistant Examiner—Stephen J. Kalafut
Attorney, Agent, or Firm—Antonelli, Terry & Wands

[57]         ABSTRACT

A methanol fuel cell with an electrolyte ion exchange membrane integrated with an oxidizer electrode containing water-repellent particles on one side of the membrane and with a hydrophilic fuel electrode containing no water-repellent particles on the other side thereof and with less contact resistance between the ion exchange membrane and the electrodes and a three-phase boundary readily formable in the oxidizer electrode.

18 Claims, 8 Drawing Figures (a)
(b)

FUEL CELL

BACKGROUND OF THE INVENTION

1. Field of the Invention

This invention relates to a fuel cell using methanol as a fuel, and more particularly to an improvement of a fuel cell using an electrolyte ion exchange membrane.

2. Description of the Prior Art

A fuel cell using an electrolyte ion exchange membrane is disclosed, for example, in Japanese patent application Kokai (Laid-open) No. 56-138874, where catalyst particles are fixed to the surface of an ion exchange membrane, and the ion exchange membrane and an electrode are integrated into one body. The procedures for fixing catalyst particles to the surface of an ion exchange membrane are described in detail therein together with the prior art ones. According to one of the procedures disclosed therein, the surface of an ion exchange membrane is roughened and catalyst particles are fixed to the roughened surface, where a binder such as polytetrafluoroethylene, etc. is required when the amount of catalyst particles to be fixed exceeds about 2 mg/cm$^2$.

According to another procedure disclosed in U.S. Pat. No. 3,134,697, an electrode material comprising metal or alloy powder and a resin binder is distributed onto the surface of an ion exchange resin membrane and integrated with the ion exchange resin membrane at an elevated temperature under pressure.

All of the integrated electrodes disclosed in Japanese patent application Kokai (Laid-open) No. 56-138874 are hydrophilic on the electrode surfaces, and even if polytetrafluoroethylene having a water-repellent property is used as a binder, the electrode surfaces are substantially hydrophilic and not water-repellent.

Thus, the integrated electrode having catalyst particles integrated with an ion exchange membrane so far proposed is hydrophilic, and is not suitable for an oxidizer electrode (or cathode or air electrode) of a fuel cell using methanol as fuel, because, in the case of using such an oxidizer electrode, a three-phase boundary is hardly obtainable among catalyst particles (solid), a fuel (liquid) and an oxidizer (gas) with the result of a poor cell performance.

SUMMARY OF THE INVENTION

An object of the present invention is to provide a fuel cell with an integrated electrode having catalyst particles fixed to an ion exchange membrane and using methanol as a fuel, where the three-phase boundary is readily obtainable with an oxidizer electrode.

Another object of the present invention is to provide a methanol fuel cell with an oxidizer electrode having water-repellent particles and catalyst particles finely distributed by the presence of the water-repellent particles.

According to the present invention, water-repellent particles and noble metal particles having a catalytic action are supported on one side of an ion exchange membrane to provide an oxidizer electrode, whereas noble metal particles having a catalytic action are supported on the other side thereof to provide a fuel electrode. That is, an oxidizer electrode and a fuel electrode are integrally formed on one side and another side, respectively, of an ion exchange membrane.

The air electrode of methanol fuel cell must be water-repellent and have a three-phase boundary, i.e. an interface of liquid phase-solid phase-gas phase, when the relevant reaction is taken into account. On the other hand, the fuel electrode (sometimes called an anode or a methanol electrode) must be hydrophilic.

It has been found that a methanol fuel cell having an integrated electrode which comprises an oxidizer electrode having a water-repellent property on one side of an electrolyte ion exchange membrane, and a fuel electrode having a hydrophilic property on the other side thereof, while noble metal catalyst particles are fixed to both sides thereof, has a considerably distinguished cell performance over the fuel cell having a hydrophilic oxidizer electrode and fuel electrode integrated with an ion exchange membrane. The difference between these cells is larger than that in cell performance between a methanol fuel cell having integrated hydrophilic electrodes and a methanol fuel cell having unintegrated electrodes and ion exchange membrane. The distinguished cell performance of the present fuel cell can be due to a combination of the oxidizer electrode having a water-repellent property with the integration of the electrodes with an ion exchange membrane.

It is desirable that an oxidizer electrode contains water-repellent particles and is made water-repellent by the water-repellent particles. The water-repellent particles can include polytetrafluoroethylene, styrene-divinylbenzene co-polymer, polyethylene and fluorocarbon, etc. It is necessary that the water-repellent particles exist at least on the surface of an oxidizer electrode. The water-repellent particles can be distributed throughout the entire oxidizer electrode. It is desirable that the water-repellent particles have a particle size of 0.1-1 $\mu$m. If the particle size is too small, the water-repellent particles are liable to coagulate, whereas, if too large, the water repellency becomes too strong to form the three-phase boundary.

It is desirable to use noble metal particles as catalyst particles for both oxidizer electrode and fuel electrode, and it is desirable to use at least one of platinum, ruthenium, palladium and rhodium of the periodic table, Group VIII as the noble metal particles. Particularly, platinum is desirable as the catalyst particles for an oxidizer electrode, and a mixture of platinum and ruthenium is desirable as the catalyst particle for a fuel electrode.

It is desirable that 1-6 mg/cm$^2$ of catalyst particles is supported for both oxidizer electrode and fuel electrode. If the catalyst particles are supported in an amount of less than 1 mg/cm$^2$, a satisfactory cell performance cannot be obtained, whereas, above 6 mg/cm$^2$, the cell performance is no more improved.

In integral formation of an oxidizer electrode or a fuel electrode on the surface of an ion exchange membrane, various binders can be used, for example, polytetrafluoroethylene.

The most appropriate procedure for integral formation of an oxidizer electrode on the surface of an ion exchange membrane is a composite coating procedure, and likewise the most preferable procedure for integration of an oxidizer electrode on the surface of an ion exchange membrane is a chemical plating procedure. By utilizing these plating procedures, use of a binder can be omitted, and furthermore noble metal particles can be made to exist in a very fine state.

Composite coating can be carried out by contacting one side of an ion exchange membrane with a solution containing noble metal and water-repellent particles and contacting the other side with a reducing agent solution, thereby conducting chemical plating. By dispersion plating, the noble metal particles and the water-repellent particles are supported on the surface of the ion exchange membrane on the side contacted with the solution containing the noble metal and the water-repellent particles. After the plating, the ion exchange membrane is washed with water and dried, whereby the ion exchange membrane integrated with the oxidizer electrode can be obtained.

By dispersing water-repellent particles in a solution containing noble metal ion in advance, the noble metal particles can be distributed on the surface of the ion exchange membrane in a very fine and uniform state. For example, according to a test of dispersing polytetrafluoroethylene particles in a chloroplatinic acid solution, followed by chemical plating, the resulting platinum particles have particle sizes of 70±5 Å, which are considerably smaller than those obtained by chemical plating with a chloroplatinic acid solution containing no water-repellent particles, i.e. 90–120 Å.

Integral formation of a fuel electrode on the other side of the ion exchange membrane can be also carried out by substantially same chemical plating as in formation of an oxidizer electrode. In this case, it is not necessary to add water-repellent particles to the solution containing noble metal, or rather such addition must be avoided. Except for this difference, the fuel electrode can be formed by chemical plating in quite same manner as in forming the oxidizer electrode. The fuel electrode thus formed can usually have noble metal particles having particle sizes of 90–120 Å. In most cases, the noble metal particles supported on the surface of an ion exchange membrane by composite coating have particle sizes of 60–80 Å.

When platinum particles are used as noble metal, a further difference appears in behavior of platinum particles between the case of supporting it on an ion exchange membrane by dispersion plating and the case by chemical plating with no addition of the water-repellent particles. That is, platinum black is formed when the water-repellent particles are used, whereas platinum particles have a metallic luster when no such water-repellent particles are used.

PREFERRED EMBODIMENTS OF THE INVENTION

Figure 1:
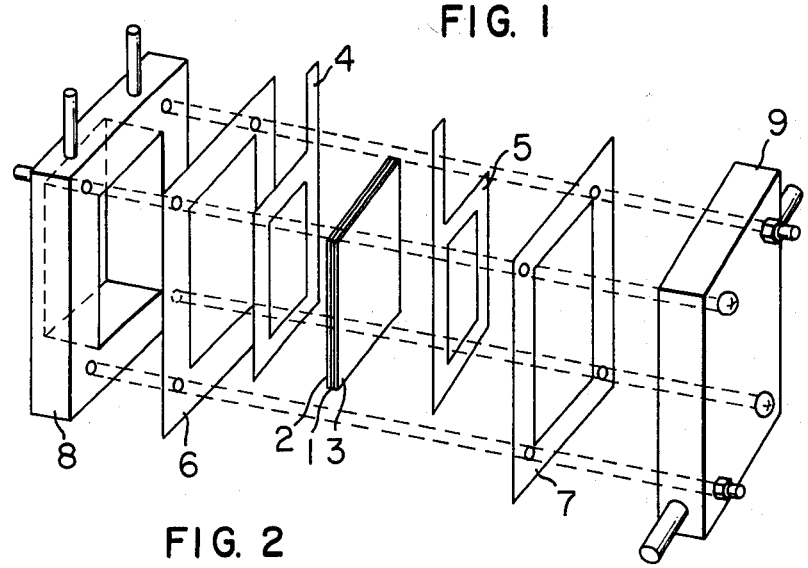
FIG. 1 is a schematic structural view showing essential members of a methanol fuel cell.
Figure 2:
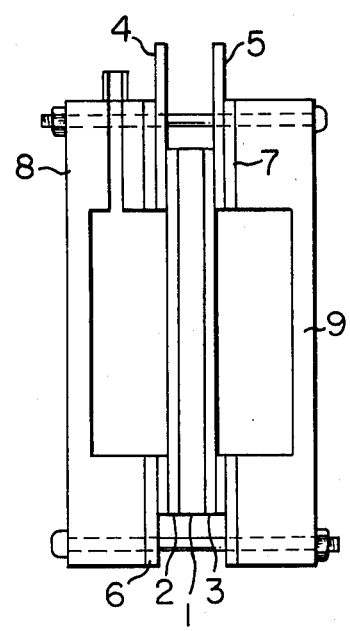
FIG. 2 is a side view of a methanol fuel cell.

As shown in FIG. 1 and FIG. 2, a methanol fuel cell has a methanol electrode (fuel electrode) 2 and an air electrode (oxidizer electrode) 3 at one side and another side, respectively, of an ion exchange membrane 1 as an electrolyte.

In a fuel cell according to the present invention, the ion exchange membrane 1, the methanol electrode 2 and the air electrode 3 are integrated into one body, and thus there is no contact resistance between the electrodes 2 and 3 and the ion exchange membrane 1 with the result of prevention of cell performance from lowering due to the contact resistance between the electrodes and the ion exchange membrane. Furthermore, the present fuel cell has no such problems that a carbon dioxide gas as a reaction product at the methanol electrode 2 is retained between the methanol electrode 2 and the ion exchange membrane 1 to disturb the electrode reaction or to increase the resistance at the interfaces.

Numeral 4 is a current collector at the methanol electrode, 5 a current collector at the air electrode, 6 a sealant for methanol fuel chamber, 7 a sealant for air chamber, 8 a methanol fuel chamber, and 9 an air chamber. It is desirable to use a strongly acidic ion exchange membrane as the ion exchange membrane.

Electricity is generated in a methanol fuel cell in the following manner. For example, a 3 M $H_2SO_4$ solution is mixed with methanol to make the concentration of 1 mole/l, and the resulting solution is introduced into the methanol fuel chamber 8, while air or oxygen is introduced into the air chamber 9 and keeping the cell temperature at 50°–60° C., whereby an electric current can be immediately withdrawn therefrom into an outer circuit. At that time, methanol is oxidized at the methanol electrode 2 to produce carbon dioxide gas, hydrogen ions and electrons. The thus formed hydrogen ions migrate through the strongly acidic ion exchange membrane 1 and react with oxygen and electrons from the outer circuit at the air electrode 3 to form water.

TEST EXAMPLE 1

Figure 3:
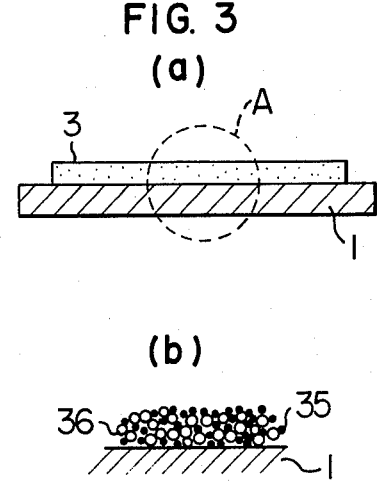
FIG. 3 is schematic structural views showing one embodiment of an air electrode for a fuel cell according to the present invention, where (a) shows a cross-sectional view and (b) shows a detailed schematic view of part A in (a).

An ion exchange membrane 1 of styrene-divinylbenzene co-polymer system having sulfonate groups was used. A reducing agent solution was provided in a chamber in contact with the membrane 1 at one side and a platinum catalyst solution in a chamber in contact with the other side of the membrane 1, and the catalyst was fixed to the membrane 1 by chemical plating. The reducing agent solution was a 5 mol. % hydrazine solution, and the catalyst solution was a 0.5 mol. % chloroplatinic acid solution containing 1.5 wt. % of water-repellent particles (Polyflon Dispersion D-1, made by Daikin Kogyo K. K., Japan). The chemical plating was carried out at room temperature for 2 hours, and the membrane was washed with water and left standing at room temperature until the electrode catalyst on the membrane 1 was dried. The thus prepared electrode catalyst formed an air electrode 3 as tightly fixed to the ion exchange membrane 1 together with the water-repellent particles, as shown in FIG. 3(a), and the catalyst surface had a water-repellent property. Furthermore, as shown in FIG. 3(b), platinum electrode catalyst 35 and water-repellent particles 36 were supported on the ion exchange membrane 1, where the platinum electrode catalyst 35 turned platinum black, which means that a kind of composite coating was carried out. X-ray diffraction of platinum electrode catalyst 35 as the catalyst revealed that the primary particles of the catalyst had a particles size of 77 Å, the amount of supported platinum was 5 mg/cm$^2$, and the water-repellent particles had particle sizes of 0.2-0.4 μm.

Figure 4:
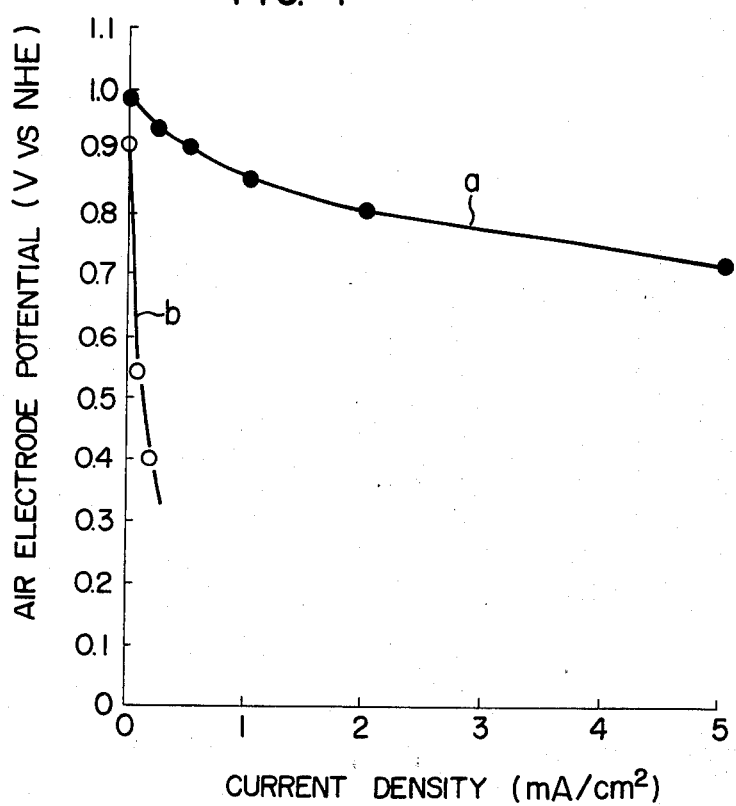
FIG. 4 is a diagram showing relationship between a current density and a potential at the air electrode of a methanol fuel cell for explaining the effect of the embodiment shown in FIG. 3.

The thus obtained ion exchange membrane 1 integrated with the air electrode 3 was subjected to single electrode measurement to determine relationship between a current density and an air electrode potential. The results are shown by curve a in FIG. 4, where an open circuit potential was 0.99 V and an air electrode potential at the current density of 5 mA/cm$^2$ was 0.72 V.

TEST EXAMPLE 2

A 0.5 mol. % chloroplatinic acid solution was used as a catalyst solution, and an electrode catalyst containing no water-repellent particles was supported on one side of the ion exchange membrane 1 under the same conditions as in Test Example 1. Platinum supported as the electrode catalyst had a metallic luster and was readily wettable with water. X-ray diffraction of the thus obtained platinum revealed that the primary particles of the catalyst had a particle size of 92 Å, and the amount of supported platinum was 5 mg/cm$^2$. The thus obtained membrane was subjected to single electrode measurement as an air electrode, and the results are shown by curve b in FIG. 4, where an open circuit voltage was 0.91 V, but the air electrode potential was rapidly lowered by outputting a current, and was 0.4 V at the current density of 0.25 mA/cm$^2$.

Comparison in performance between Test Examples 1 and 2 revealed that according to Test Example 1 of using an air electrode 3 having both water-repellent particles 36 and platinum electrode catalyst 35 on one side of the ion exchange membrane 1 had a remarkably improved performance as an air electrode for a methanol fuel cell. This seems due to the fact that a three-phase boundary was readily formed.

TEST EXAMPLE 3

A mixture of 0.5 mol. % of chloroplatinic acid and 0.5 mol. % of ruthenium chloride was used as a catalyst solution, and an electrode catalyst was supported on other side of ion exchange membrane 1 under the same conditions as in Test Example 1 to obtain a methanol electrode 2.

Figure 6:
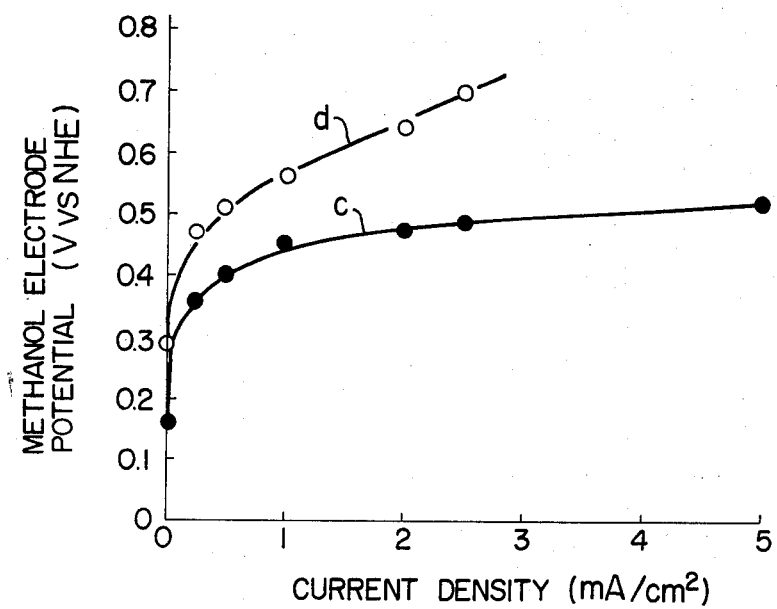
FIG. 6 is a diagram showing relationship between a current density and a potential at the methanol electrode of a methanol fuel cell for explaining the effect of methanol electrode in FIG. 5.

The thus obtained ion exchange membrane 1 integrated with the methanol electrode 2 was subjected to single electrode measurement to determine relationship between a current density and a methanol electrode potential. The results are shown by curve c in FIG. 6, where an open circuit voltage was 0.16 V and a potential at the current density of 5 mA/cm$^2$ was 0.52 V.

TEST EXAMPLE 4

A platinum electrode catalyst containing no ruthenium was supported on other side of ion exchange membrane 1 in the same manner as in Test Example 2 to obtain a methanol electrode, and the thus obtained membrane was subjected to single electrode measurement. The result are shown by curve d in FIG. 6, where an open circuit voltage was 0.29 V, and a methanol electrode potential at the current density of 2.5 mA/cm$^2$ was 0.7 V.

From the results of Test Examples 3 and 4 it has been found that a methanol electrode 2 having an electrode catalyst consisting of two components, platinum and ruthenium, or an ion exchange membrane 1 had a more distinguished performance due to the promotor effect of ruthenium.

EXAMPLE

Figure 5:
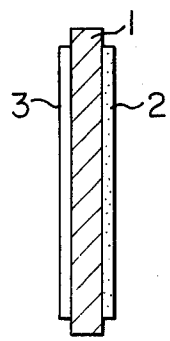
FIG. 5 is a schematic structural view of an air electrode and a methanol electrode showing another embodiment according to the present invention.

Water-repellent particles and platinum electrode catalyst were supported on one side of ion exchange membrane in the same manner as in Test Example 1 to form an air electrode 3 and then an electrode catalyst consisting of two components, platinum and ruthenium, was supported on the other side of the ion exchange membrane 1 in the same manner as in Test Example 3 to obtain a methanol electrode 2. The ion exchange membrane 1 integrated with the air electrode 3 on one side and with the methanol electrode 2 on the other side, as shown in FIG. 5 was assembled into a methanol fuel cell having the structure shown in FIG. 1 and subjected to cell performance measurement. The results are shown in FIG. 7, where a solution containing 1 mol. % of methanol and 3 mol. % of sulfuric acid was used as a fuel, and air as an oxidizer; the air was supplied by an air pump at a flow rate of 100 ml/min. and the working temperature of the cell was 60° C.

Figure 7:
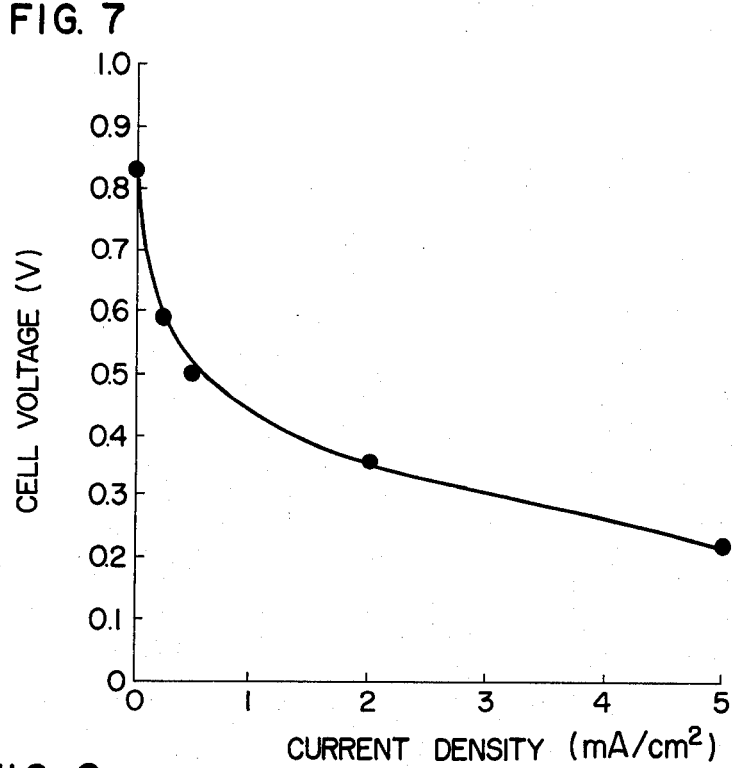
FIG. 7 is a diagram showing relationship between a current density and a cell voltage in a methanol fuel cell for explaining the effect of the embodiment in FIG. 5.

FIG. 7 is a diagram showing relationship between a current density and a cell voltage, where an open circuit voltage was 0.83 V, and a cell voltage at the current density of 5 mA/cm$^2$ was 0.22 V. It has been found that a good cell performance was obtained.

COMPARATIVE EXAMPLE

The same chloroplatinic acid solution as used in Test Example 1 was reduced with hydrazine to obtain platinum black, and the platinum black was mixed with water-repellent particles (Polyflon Dispersion D-1, made by Daikin Kogyo K. K., Japan) to obtain an air electrode catalyst. The catalyst contained 10 wt. % of the water-repellent particles as a water repellent and a binder. The catalyst was applied to a tantalum wire netting as a current collector at a platinum rate of 5 mg/cm$^2$ to obtain an air electrode.

On the other hand, the same catalyst solution as used in Test Example 3 was reduced with hydrazine and mixed with the said water-repellent particles to obtain a methanol electrode catalyst, which contained 5 wt. % of the water-repellent particles as a binder. The thus obtained catalyst was applied to a tantalum wire netting at a platinum rate of 5 mg/cm$^2$ to obtain a methanol electrode.

The thus obtained two electrodes were placed on one side and the other side, respectively, of an ion exchange resin membrane of styrene-divinylbenzene co-polymer having sulfonate groups and assembled into a fuel cell having the structure shown in FIG. 2 and subjected to cell performance measurement.

Figure 8:
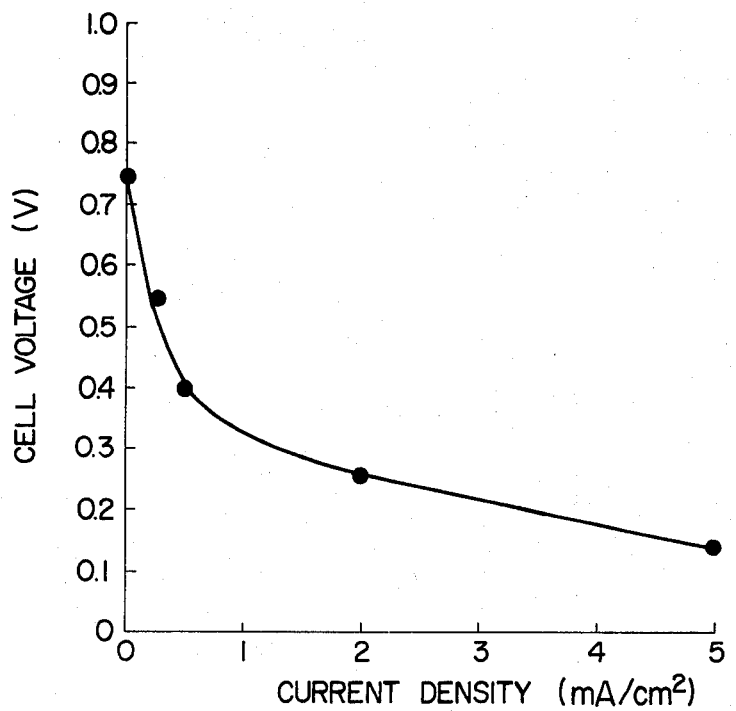
FIG. 8 is a diagram showing relationship between a current density and a cell voltage in a cell according to Comparative Example.

The results are shown in FIG. 8. The cell had an open circuit voltage of 0.75 V and a cell voltage of 0.14 V at the current density of 5 mA/cm$^2$.

As described in detail above, according to the present invention an integrated air electrode 4 is provided by supporting water-repellent particles 36 and platinum electrode catalyst 35 on one side of an ion exchange membrane 5, whereby a three-phase boundary can be readily formed and a performance of air electrode for a methanol fuel cell can be greatly increased. Furthermore, according to the present invention, an electrode catalyst consisting of two components, i.e. platinum and ruthenium, is supported on the other side of ion exchange membrane 1 to form an integrated methanol electrode 2. No clearance can be provided between the ion exchange membrane 1 and the electrodes 2 and 3, whereby the contact resistance can be considerably reduced.

Since there is no clearance between the ion exchange membrane 1 and the methanol electrode 2, the carbon dioxide gas generated at the methanol electrode 2 is not retained at all, whereby the cell performance can be improved.

According to the present invention, a cell assembling time can be reduced to above 1/5 of that required for assembling a fuel cell from separately prepared air electrode, methanol electrode and ion exchange membrane.

Thus according to the present invention, the contact resistance can be greatly reduced between the ion exchange membrane and the electrodes to improve the cell performance and also the assembling work.

What is claimed is:

1. A fuel cell, which comprises an electrolyte ion exchange membrane, an oxidizer electrode, having water-repellent properties, comprising a mixture of noble metal particles of the periodic table, Group VIII and water repellent particles supported on one side of the ion exchange membrane, said mixture being formed on one side of the ion exchange membrane by dispersion plating, a hydrophilic fuel electrode containing noble metal particles of the periodic table, Group VIII and fixed to the opposite side of the membrane to the oxidizer electrode-formed side, an oxidizer supply means for supplying an oxidizer to the oxidizer electrode, and a methanol supply means for supplying methanol to the fuel electrode.

2. The fuel cell according to claim 1, wherein the ion exchange membrane is a strongly acidic ion exchange membrane.

3. The fuel cell according to claim 1, wherein the oxidizer is air.

4. The fuel cell according to claim 1, wherein the noble metal is at least one of platinum, ruthenium, palladium and rhodium of the periodic table, Group VIII.

5. The fuel cell according to claim 4 or 1, wherein the noble metal is platinum.

6. The fuel cell according to claim 1, wherein the water-repellent particles are at least one of styrene-divinylbenzene copolymer, polyethylene and fluorocarbon.

7. The fuel cell according to claim 6, wherein the fluorocarbon is polytetrafluoroethylene.

8. The fuel cell according to claim 1, wherein the noble metal particles and the water-repellent particles are supported on one side of the ion exchange membrane by contacting the said side of the membrane with a solution containing the noble metal of the periodic table, Group VIII and the water-repellent particles and contacting the opposite side with a reducing agent solution, thereby conducting chemical plating and fixing the noble metal particles and the water-repellent particles on the side contacted with the solution containing the noble metal and the water-repellent particles.

9. The fuel cell according to claim 8, wherein the noble metal particles are supported on the oxidizer electrode at a support amount of 1-6 mg/cm$^2$.

10. The fuel cell according to claim 8, wherein the water-repellent particles have particle sizes of 0.1-1 μm.

11. The fuel cell according to claim 8, wherein the noble metal particles on the oxidizer electrode have particle sizes of 60-80 Å.

12. A fuel cell which comprises an electrolyte ion exchange membrane, an oxidizer electrode, having water-repellent properties, comprising a mixture of noble metal particles of the periodic table, Group VIII and water-repellent particles supported on one side of the ion exchange membrane, said mixture being formed on one side of the ion exchange membrane by dispersion plating, a hydrophilic fuel electrode comprising noble metal particles of the periodic table, Group VIII supported on the opposite side of the membrane to the oxidizer electrode-formed side by chemical plating, an oxidizer supply means for supplying an oxidizer to the oxidizer electrode and a methanol supply means for supplying methanol to the fuel electrode.

13. The fuel cell according to claim 12, wherein the noble metal particles are supported on the opposite side of the ion exchange membrane by contacting the side, on which the oxidizer electrode is to be formed, of the membrane with a reducing agent solution and contacting the opposite side with a solution containing the noble metal of the periodic table, Group VIII, thereby conducting chemical plating and fixing the noble metal particles on the side contacted with the solution containing the noble metal.

14. The fuel cell according to claim 13, wherein the noble metal consists of platinum and ruthenium.

15. The fuel cell according to claim 13, wherein the noble metal particles are supported at a support rate of 1-6 mg/cm$^2$.

16. The fuel cell according to claim 13, wherein the noble metal particles have particle sizes of 60-80 Å.

17. The fuel cell according to claim 12, wherein the noble metal particles of the fuel electrode consist of platinum and ruthenium.

18. A fuel cell which comprises an electrolyte ion exchange membrane, an oxidizer electrode, having water-repellent properties, containing noble metal particles of the periodic table, Group VIII and water-repellent particles supported on one side of the membrane, said mixture being formed on one side of the ion exchange membrane by dispersion plating, a hydrophilic fuel electrode containing noble metal particles of the periodic table, Group VIII adjacent to the opposite side of the membrane to the oxidizer electrode-supported side, an oxidizer supply means for supplying an oxidizer to the oxidizer electrode, and a methanol supply means for supplying methanol to the fuel electrode.

* * * * *